(12) United States Patent
Gillet

(10) Patent No.: US 11,847,524 B2
(45) Date of Patent: *Dec. 19, 2023

(54) METHODS, SYSTEMS, AND APPARATUSES FOR SCANNING AND DECODING DIRECT PART MARKING INDICIA

(71) Applicant: Hand Held Products, Inc., Charlotte, NC (US)

(72) Inventor: Alain Gillet, Toulouse (FR)

(73) Assignee: Hand Held Products, Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,756

(22) Filed: Aug. 23, 2022

(65) Prior Publication Data

US 2022/0398394 A1 Dec. 15, 2022

Related U.S. Application Data

(63) Continuation of application No. 17/235,443, filed on Apr. 20, 2021, now Pat. No. 11,461,573, which is a
(Continued)

(51) Int. Cl.
*G06K 7/14* (2006.01)
*G06K 7/10* (2006.01)

(52) U.S. Cl.
CPC ....... *G06K 7/1413* (2013.01); *G06K 7/10722* (2013.01)

(58) Field of Classification Search
CPC ............. G06K 7/1413; G06K 7/10722; G06K 7/10732; G06K 7/10831
See application file for complete search history.

(56) References Cited

U.S. PATENT DOCUMENTS 5,585,616 A 12/1996 Roxby et al.
5,864,580 A 1/1999 Lowe et al.
(Continued)

FOREIGN PATENT DOCUMENTS

JP 2006-126974 A 5/2006

OTHER PUBLICATIONS

U.S. Appl. No. 17/235,443, filed Apr. 20, 2021, U.S. Pat. No. 11,461,573, Issued.
(Continued)

*Primary Examiner* — Matthew Mikels
(74) *Attorney, Agent, or Firm* — Alston & Bird LLP

(57) ABSTRACT

Various embodiments described herein relate to a scanning system for scanning and decoding direct part markings (DPM) type indicia. The scanning system includes an arrangement of an illumination module, a beam splitter module, and a telecentric lens assembly. The telecentric lens assembly is adapted to direct an in-line illumination received from the illumination module as collimated light to illuminate the DPM indicia. Upon illumination, a first portion of light reflected from embossments of the DPM indicia that are incident on the telecentric lens assembly at a defined angle is decoupled from an optical path between the telecentric lens assembly and the target. An imager is exposed to a second portion of reflected light, excluding the decoupled reflected light that is reflected from a substrate on the DPM indicia, in order to capture an image of the DPM indicia for decoding.

20 Claims, 5 Drawing Sheets

Related U.S. Application Data continuation of application No. 16/683,490, filed on Nov. 14, 2019, now Pat. No. 11,010,575, which is a continuation of application No. 16/026,527, filed on Jul. 3, 2018, now Pat. No. 10,509,931.

(56) References Cited

U.S. PATENT DOCUMENTS

| | | | |
|---|---|---|---|
| 7,017,812 | B1 | 3/2006 | Schramm et al. |
| 10,509,931 | B1 * | 12/2019 | Gillet ............ G06K 7/10732 |
| 11,010,575 | B2 * | 5/2021 | Gillet ............ G06K 7/10831 |
| 11,461,573 | B2 * | 10/2022 | Gillet ............ G06K 7/10722 |
| 2004/0008920 | A1 | 1/2004 | Endicott |

OTHER PUBLICATIONS

U.S. Appl. No. 16/683,490, filed Nov. 14, 2019, U.S. Pat. No. 11,010,575, Issued.

U.S. Appl. No. 16/026,527, filed Jul. 3, 2018, U.S. Pat. No. 10,509,931, Issued.

Communication about intention to grant a European patent received for European Application No. 19183453.0, dated Jul. 12, 2022, 6 pages.

Communication pursuant to Rules 70(2) and 70a(2), for European Patent Application No. 19183453.0, dated Apr. 6, 2020, 2 pages.

Decision to grant a European patent received for European Application No. 19183453.0, dated Nov. 24, 2022, 2 pages.

Diffuse On-Axis Lighting (DOAL), Machine Vision Lighting (brochure) MICROSCAN (dated 2015) 2 pages.

Diffused Axial Lights [online] [retrieved Apr. 6, 2016]. Retrieved from the Internet: <URL: https://www.metaphase-tech.com/diffused_axial_lights>. (undated) 3 pages.

DOAL Light Video [online] [retrieved Apr. 6, 2016]. Retrieved from the Internet: <URL: http://www.microscan.com/en-us/trainingandresources/videos/doallight . . . >. (dated 2015) 1 page.

European search opinion dated Feb. 27, 2020 for EP Application No. 19183453.0, 6 pages.

European search report dated Feb. 27, 2020 for EP Application No. 19183453.0, 2 pages.

Extended European Search Report for Application No. 19183453.0, dated Feb. 27, 2020, 10 pages.

Final Rejection dated Jun. 10, 2019 for U.S. Appl. No. 16/026,527.

In-line Illumination Considerations [online] [retrieved Apr. 6, 2016]. Retrieved from the Internet: <URL: http://www.edmundoptics.com/resources/application- notes/illuminatio . . . >. (undated) 4 pages.

Non-Final Rejection dated Aug. 24, 2020 for U.S. Appl. No. 16/683,490.

Non-Final Rejection dated Jan. 29, 2019 for U.S. Appl. No. 16/026,527.

Notice of Allowance and Fees Due (PTOL-85) dated Aug. 16, 2019 for U.S. Appl. No. 16/026,527.

Notice of Allowance and Fees Due (PTOL-85) dated Jan. 19, 2021 for U.S. Appl. No. 16/683,490.

Notice of Allowance received for U.S. Appl. No. 17/235,443, dated May 23, 2022, 7 pages.

Office Action received for European Application No. 19183453.0, dated Aug. 19, 2021, 4 pages.

Requirement for Restriction/Election dated Apr. 29, 2020 for U.S. Appl. No. 16/683,490.

Requirement for Restriction/Election dated Nov. 23, 2018 for U.S. Appl. No. 16/026,527.

When To Consider Inline Illumination, Quality Magazine [online] [retrieved Apr. 6, 2016]. Retrieved from the Internet: <URL: http://www.qualitymag.com/articles/91564-when-to-consider-inline-il . . . >. (dated Jan. 3, 2014) 5 pages.

Non-Final Rejection dated Feb. 8, 2022 for U.S. Appl. No. 17/235,443, 6 page(s).

* cited by examiner

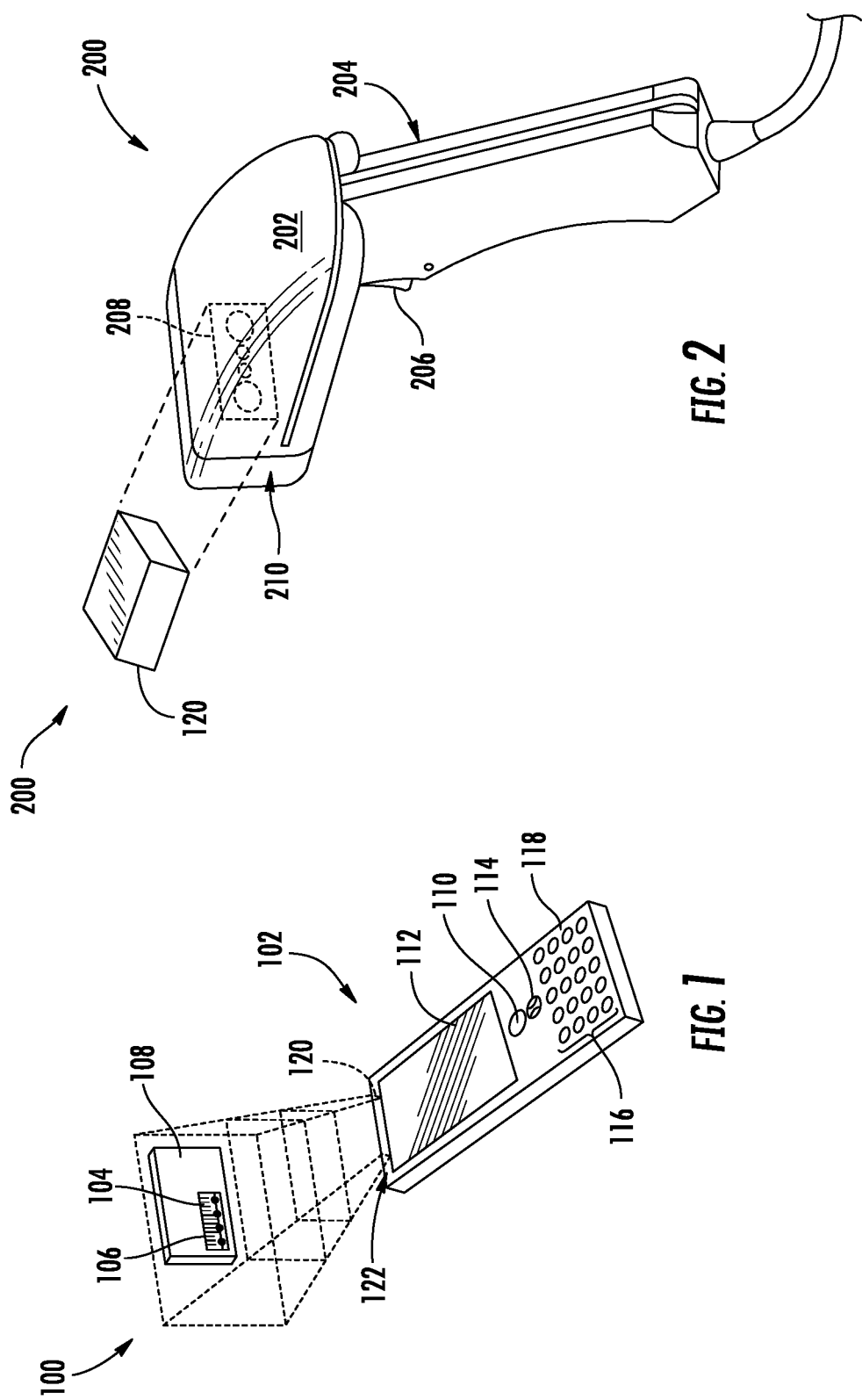

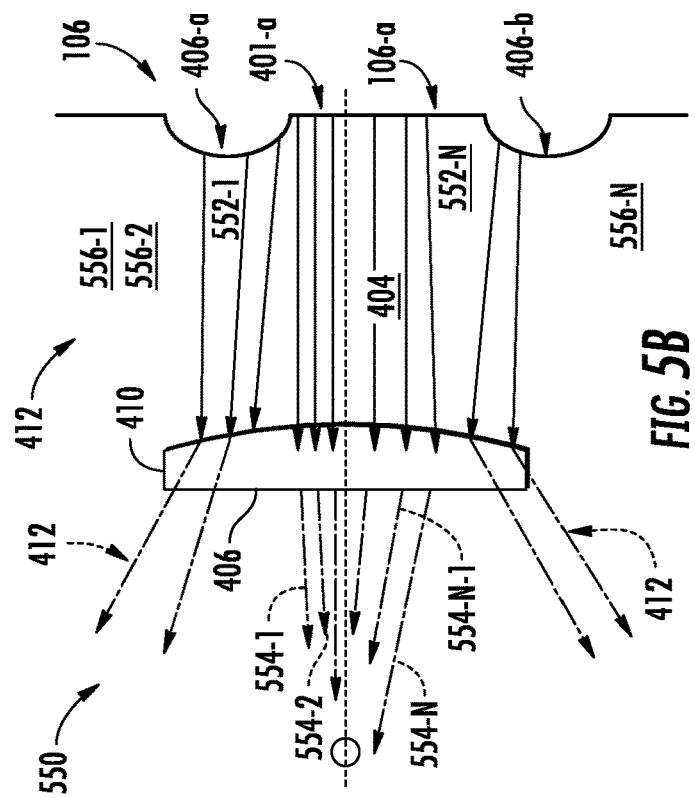
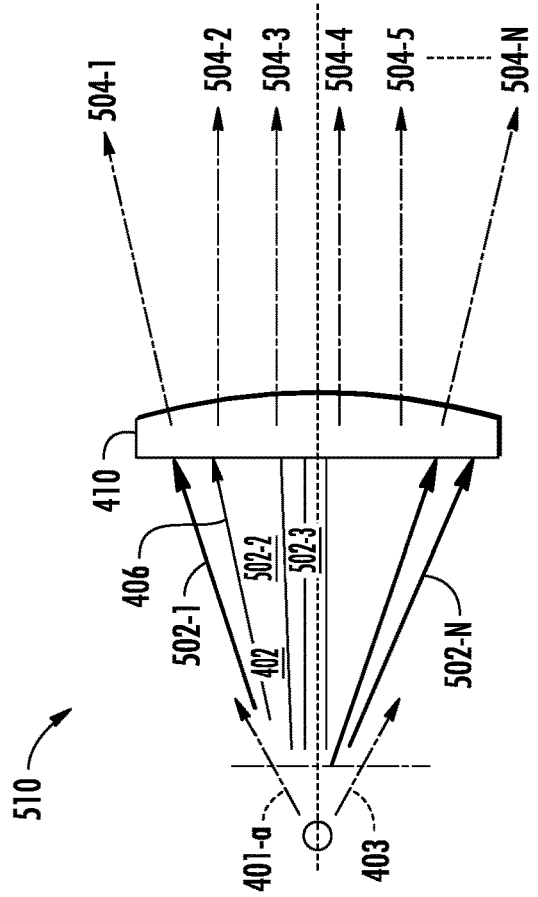
FIG. 5B
FIG. 5A

METHODS, SYSTEMS, AND APPARATUSES FOR SCANNING AND DECODING DIRECT PART MARKING INDICIA

CROSS REFERENCE TO RELATED APPLICATIONS

The present application is a continuation application of U.S. application Ser. No. 17/235,443, filed Apr. 20, 2021, which is a continuation application of U.S. patent application Ser. No. 16/683,490, filed Nov. 14, 2019, which is a continuation application of U.S. patent application Ser. No. 16/026,527, filed Jul. 3, 2018, each of which is incorporated by reference herein in its entirety.

TECHNOLOGICAL FIELD

Exemplary embodiments of the present disclosure relate generally to scanning systems and, more particularly, to methods, systems, and apparatuses for scanning direct part marking (DPM) indicia.

BACKGROUND

Generally, indicia reading devices such as scanners, laser scanners, image readers, optical readers, indicia readers, mobile computers, terminals, or the like read data represented by printed or displayed information bearing indicia (e.g., symbols, bar codes, QR codes, DPM codes etc.). In general, these indicia reading devices scan various features, such as black and white elements of a barcode or dots/embossments on a DPM indicia, by illuminating the indicia with light in order to capture an image of the indicia. This captured image may be decoded or otherwise converted into text. In this way, the effective decoding of indicia is dependent on the accuracy and quality of the captured image. Applicant has identified a number of deficiencies and problems associated with conventional methods of scanning and decoding DPM indicia. Through applied effort, ingenuity, and innovation, many of these identified problems have been solved by developing solutions that are included in embodiments of the present disclosure, many examples of which are described in detail herein.

BRIEF SUMMARY

Various embodiments described herein relate to an optical reader for decoding direct part marking (DPM) indicia. In this regard, the optical reader includes an illumination module adapted to provide an illumination of a target including the DPM indicia. The optical reader also includes a beam splitter module adapted to receive the illumination from the illumination module and project an in-line illumination in a first direction of the target. The optical reader further includes a telecentric lens assembly adapted to direct the in-line illumination projected from the beam splitter module and received at the telecentric lens assembly in a first direction of the target. In this aspect, the telecentric lens assembly, in operation, directs the in-line illumination parallel to an optical axis of the telecentric lens assembly. In accordance with the various embodiments described herein, the optical reader further includes an imaging subsystem including an imager adapted to capture an image of the target along an imaging axis of the imager. In this aspect, the imager captures the image of the target by exposing the imager to light reflected from the target. In accordance with various embodiments described herein, the telecentric lens assembly and the imaging subsystem are positioned within the optical reader such that the imaging axis of the imager is co-linear with the optical-axis of the telecentric lens assembly. The optical reader also includes a decoder module adapted to decode the DPM indicia of the captured image.

In accordance with said embodiments, the beam splitter module is further adapted to merge the in-line illumination received from the illumination module in a direction of the imaging axis of the imager.

According to some embodiments, the telecentric lens assembly is arranged between the target and the imager and the beam splitter is arranged between the illumination module and the telecentric lens assembly. Further, in accordance with said embodiments, in operation, the telecentric lens assembly is adapted to direct the in-line illumination received from the beam splitter module in the first direction of the target when the in-line illumination is incident on a first surface of the telecentric lens assembly. Further, in accordance with said embodiments, in operation, the telecentric lens assembly is adapted to direct a first portion of light in a second direction of the imager. In this aspect, the first portion of the light corresponds to a portion of light reflected back from the target, parallel to the optical axis of the telecentric lens assembly, and incident on a second surface of the telecentric lens assembly. Further, in accordance with said embodiments, the telecentric lens assembly is further adapted to decouple a second portion of light reflected from the target when the second portion of light is incident on the second surface of the telecentric lens assembly.

In accordance with some embodiments, a scanning system adapted to be mechanically coupled to an optical reader is described. In this aspect, the scanning system includes, an illumination module adapted to provide an illumination of a target including DPM indicia. The scanning system also includes a beam splitter module adapted to project the illumination received from the in-line illumination in a first direction of the target. Further, the scanning system includes a telecentric lens assembly adapted to direct the in-line illumination incident on a first surface of the telecentric lens assembly in the form of collimated light. In this regard, the telecentric lens assembly is adapted to direct the in-line illumination in the first direction of the target and parallel to an optical axis of the telecentric lens assembly. According to the said embodiment, the telecentric lens assembly is further adapted to decouple a first portion of reflected light from the target. In this regard, in accordance with said embodiments, the first portion of reflected light is incident on a second surface of the telecentric lens assembly at a defined angle with respect to the optical axis of the telecentric lens assembly. Further, the telecentric lens assembly may be adapted to direct a second portion of reflected light from the target. In this regard, the second portion of the reflected light corresponds to light which after reflection travels parallel to the optical axis of the telecentric lens in a second direction and is incident on the second surface at the telecentric lens assembly. In accordance with said embodiments, the second portion of the reflected light that is directed by the telecentric lens assembly is received at the imager of the optical reader for capturing an image of the target by exposing the imager to the second portion of the reflected light.

In accordance with some example embodiments described herein, based on the second portion of the reflected light, a reverse contrast image is captured by the imager and is used by the optical reader to decode the DPM indicia on the target.

In accordance with some example embodiments, a method for decoding DPM indicia is described. The method includes projecting light parallel to an imaging axis of an imager and in a first direction of a target including the DPM indicia. In this regard, the light is generated by an in-line illumination source. In this aspect, the method then includes exposing the imager to a portion of reflected light from the target. In this regard, the portion of the reflected light corresponds to portion of the light directed by a telecentric lens in a second direction of the imager. In accordance with said embodiments, the method then includes capturing, by the imager, an image of the DPM indicia based on the portion of the reflected light to which the imager is exposed and decoding the DPM indicia from the captured image.

The above summary is provided merely for purposes of providing an overview of one or more exemplary embodiments described herein so as to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 1 illustrates a schematic view of a scanning system including an indicia reading device in accordance with some example embodiments described herein;

FIG. 2 illustrates a schematic view of a scanning system including another type of indicia reading device in accordance with some example embodiments described herein;

FIGS. 5A and 5B graphically depict a DPM illumination assembly of the scanning system, including a telecentric lens and operations of the telecentric lens for scanning the DPM indicia, in accordance with various example embodiments described herein;

DETAILED DESCRIPTION

Figure 3:
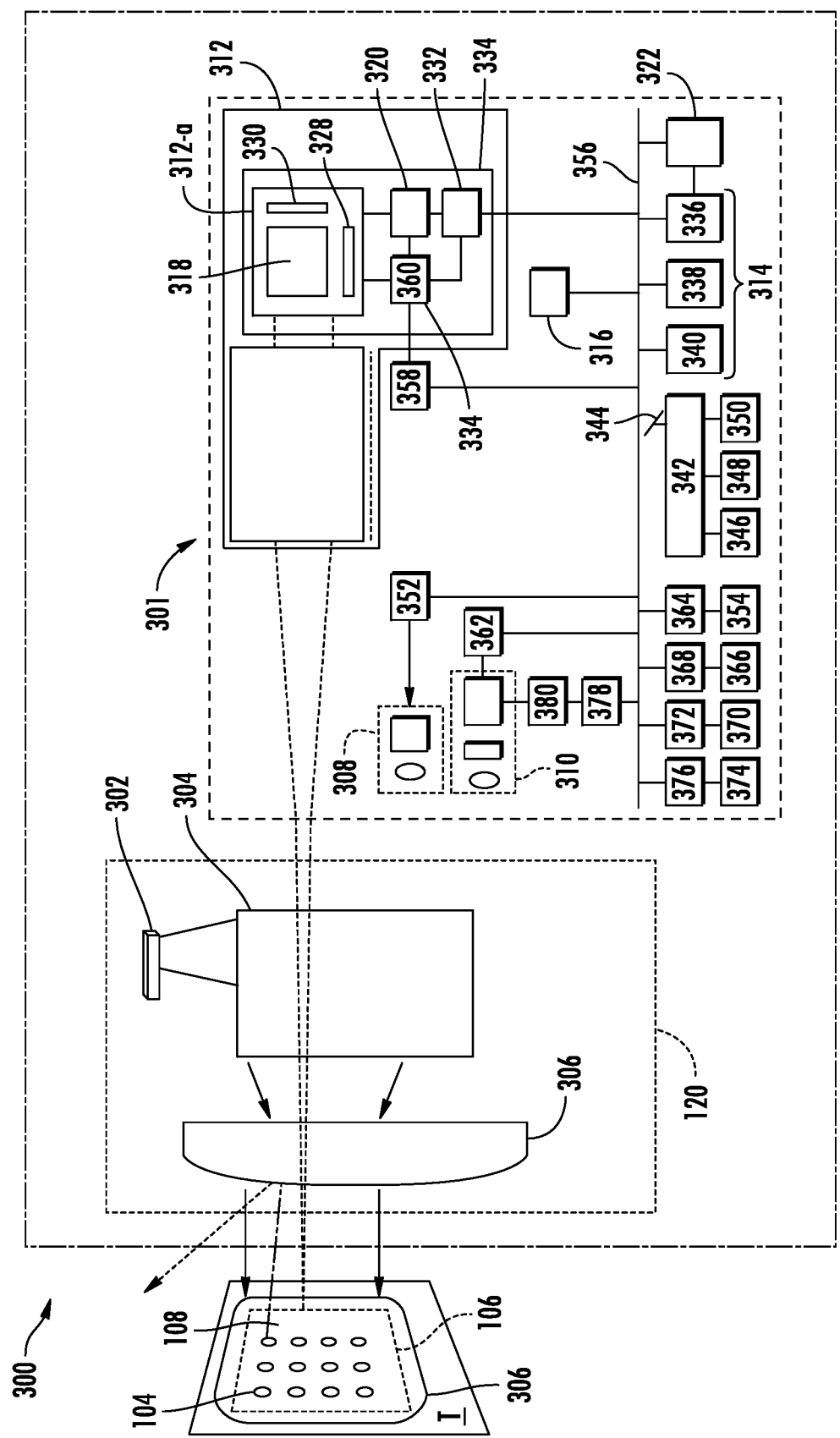
FIG. 3 is a block diagram illustrating various hardware elements of the scanning system in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Typically, indicia reading devices such as, DPM indicia scanners are equipped with imagers capable of reading indicia or coded information that is etched or imprinted directly onto a surface of materials such as plastic and metal. These DPM indicia are Data-matrix (or QR) symbols directly marked onto a substrate (metal, rubber, glass, etc.). For making the DPM indicia on a substrate, there are many marking technologies to choose from (e.g. mechanical drilling/hammering/laser etching/chemical etching/sand-blasting/mold casting/stenciling etc.) depending on a type of substrate, cost, and level of durability that may be desired. Unlike paper-based barcodes (i.e. printed on plain paper and usually printed with black ink/thermal on white backgrounds). Usually, the DPM indicia are tricky to scan, for several reasons including, but not limited to, reflectance in form of specular reflection from the substrate and lack of contrast between actual markings or embossments, and the said substrate. Often, these marks can even appear completely "washed-out" to an observer and/or to the imager of the indicia reading device. Thus, for decoding this kind of the DPM indicia, indicia reading devices particularly mobile imaging scanners, show poor performance, as in operation an illuminator of the mobile imaging scanners is in close proximity to an imaging lens, and a strong specular reflection contaminates an image captured especially for highly reflective DPM indicia.

Various embodiments of present application relate to a scanning system for scanning and decoding DPM indicia. A DPM illumination unit including an illumination module, a beam splitter module, and a telecentric lens is provided. The illumination module is adapted to generate an in-line illumination to illuminate the DPM indicia. In this regard, the illumination module is arranged with respect to a beam splitter module such that illumination generated by the illumination module is received at the beam splitter, whereby, the beam splitter module projects the in-line illumination in a first direction of a target including the DPM indicia. The beam splitter module, in this aspect, projects the in-line illumination such that light rays of the in-line illumination are converged in a direction of an imaging axis, for instance, the imaging axis of an imager of an indicia reading device that may scan and decode the DPM indicia. In this regard, in accordance with various embodiments described herein, the DPM illumination unit may be either a part of the indicia reading device itself or may be mechanically engaged with an indicia reading device.

Further, in accordance with various embodiments described herein, the telecentric lens is arranged with respect to the beam splitter module such that the in-line illumination projected from the beam splitter module is incident on a first surface of the telecentric lens. In this regard, the telecentric lens directs incident in-line illumination in a first direction of the DPM indicia such that light rays directed out from the telecentric lens are formed as collimated light that travels parallel to an optical axis of the telecentric lens. Further, in accordance with various embodiments of present application described herein, as the in-line illumination is incident and illuminates the DPM indicia, the telecentric lens is adapted to receive reflected light from the DPM indicia. In this aspect, the telecentric lens decouples portions of the reflected light received from reflections of the in-line illumination by embossments or rough surfaces on the DPM indicia. Further, the telecentric lens directs such portion of the reflected light from the DPM indicia parallel to the optical axis of the telecentric lens. In this aspect, the telecentric lens directs the portion of the reflected light in a second direction of the imager. Thus, the telecentric lens couples out any such light due to specular reflection and/or embossments of the DPM indicia. Accordingly, while scanning the DPM indicia, the imager is exposed to the portion of reflected light from the DPM indicia that is reflected from a substrate of the DPM indicia. As the imager is exposed to the correct portion of the reflected light from the DPM indicia, a reverse contrast image generated by the imager accurately represents embossments and portions of the plain substrate of the DPM indicia that may be further decoded by the imager.

Having described an example embodiment at a high level, the design of the various devices performing various example operations is provided below.

FIG. 1 illustrates a scanning system 100 that includes an indicia reading device 102 (e.g., an imaging device) in accordance with aspects of the present disclosure. In accordance with various embodiments described herein, the indicia reading device 102 may be operable for reading decodable indicia including, but not limited to, a direct part marking (DPM) indicia 104 disposed on a substrate 106 such as paper (e.g., attached to a target 108). In accordance with various embodiments described herein, the indicia reading device 102 may be any of a mobile phone, a cell phone, a satellite phone, a smart phone, a telemetric device, a personal data assistant, and/or any other device without limitation. While a single decodable indicia is illustrated and described herein, it will be appreciated that the devices of the present disclosure may be operable to capture one or more decodable indicia on a single object and/or on a plurality of objects at same time.

As illustrated, the indicia reading device 102, in some embodiments, may include a trigger 110 (e.g., button or other input element), a display 112, a pointer mechanism 114, and a keyboard 116 disposed on a common side of a hand-held housing 118. In this aspect, the display 112 and pointer mechanism 114 in combination may be regarded as a user interface of the indicia reading device 102. While illustrated and described with reference to a common side of a hand-held device, the present disclosure contemplates that one or more of the elements described herein may be located on any surface of the handheld device in any combination. In an example embodiment, the display 112 may incorporate a touch panel for navigation and virtual actuator selection in which a user interface of the indicia reading device 102 may be provided by the display 112. In accordance with various embodiments described herein, the scanning system 100 may comprise a DPM illumination assembly 120 which may include an arrangement of an illumination assembly (not shown) and a telecentric lens (not shown). In this regard, the DPM illumination unit 120 may be adapted to provide an in-line illumination and imaging by the indicia reading unit 102 of the DPM indicia 104.

FIG. 2 illustrates a schematic view of the scanning system 200 including another type of indicia reading device in accordance with some example embodiments described herein. In some embodiments, a hand-held housing 204 of an indicia reading device 202 may be devoid of a display and a keyboard, and may define form factor having a trigger 206 as shown in FIG. 2 (e.g., a gun-styled from factor). The scanning system 200 may include the DPM illuminating assembly 120 that may be, in operation, mechanically engaged to the indicia reading device 202 and/or positioned in a field of view 208 of an imaging sub-system (not shown) of the indicia reading device 202. As described above with reference to FIG. 1, the DPM illumination assembly 120 may include an arrangement of an illuminating assembly (not shown) and a telecentric lens (not shown) and may be adapted to provide an in-line illumination and imaging of a DPM indicia (e.g., DPM indicia 104).

The following description uses nomenclature associated with indicia reading devices and may generally include hand-held indicia reading devices and fixed indicia reading devices; however, one of ordinary skill in the art will recognize that aspects of the present disclosure may be incorporated in other electronic devices having an imager for image capture and/or indicia reading which may be configured as, for example, mobile phones, cell phones, satellite phones, smart phones, telemetric devices, personal data assistants, cameras, and other devices.

FIG. 3 is a block diagram illustrating various hardware components of a scanning system 300 in accordance with some example embodiments described herein. As illustrated, the scanning system 300 may include an indicia reading device 301 (e.g., indicia reading device 102 or the indicia reading device 202 as described in reference to FIGS. 1 and 2, respectively). Similarly, the DPM illumination assembly 120 that may be adapted to scan and decode decodable indicia, like the DPM indicia 104. In an example embodiment, the DPM illumination assembly 120 may include an in-line illumination module 302, a beam splitter module 304, and a telecentric lens 306 adapted for illuminating and decoding the DPM indicia 104 in operation with the indicia reading device 301.

In accordance with an embodiment described herein, the DPM illumination assembly 120 may be adapted to be mechanically engaged with a housing of the indicia reading device 301. For instance, in some embodiments, the DPM illumination assembly 120 may be mechanically engaged on the housing 118 or the housing 204 of the indicia reading device 102 and the indicia reading device 202 respectively. In this aspect, the DPM illumination assembly 120 may be mechanically engaged on the housing of the indicia reading device 301 such that an imaging axis of an imaging sub-system of the indicia reading device 301 is co-linear to an optical axis of the telecentric lens 306 of the DPM illumination assembly 120. For such an embodiment, the DPM illumination assembly may be mounted over a portion of the housing 118 or the housing 204, including an aiming window, such as aiming windows 122 or aiming window 210 as illustrated in FIGS. 1 and 2, respectively.

In accordance with another embodiment described herein, the DPM illumination assembly 120 may be located within a housing, such as the housing 118 or the housing 204 of the indicia reading device 102 and the indicia reading device 202, respectively. In this regard, the DPM illumination assembly 120 may be located within the housing such that an optical axis of the telecentric lens 306 may be co-linearly aligned with an imaging axis of an imaging subsystem of the indicia reading device 301.

In accordance with various embodiments described herein, the indicia reading device 301 may include an illumination subsystem 308, an aimer subsystem 310, an imaging subsystem 312, a memory 314, and a processing unit 316. In this aspect, the illumination subsystem 308 may be configured to project an illumination pattern, and, in some embodiments, the aimer subsystem 310 may be configured to project an aiming pattern (not shown). According to the said embodiments, the imaging subsystem 312 may include an imager 312-*a* (e.g., a stereoscopic imager or the like). As illustrated, the indicia reading device 301 includes the memory 314 that may be in communication with the imager 312-*a* and may be capable of storing frames of image data representing light incident on the imager 312-*a*. Also, as illustrated, in accordance with various embodiments, the processing unit 316 may be in communication with the memory 314 and may be configured to decode one or more indicia, for instance, the DPM indicia 104 represented in at least one of the frames of image data. In this aspect, according to some example embodiments, the indicia reading device 301 may include a decoder module including instructions executable by the processing unit 316 to decode the indicia from the stored frames of the image data.

In accordance with various embodiments described herein, in operation, the imager 312-*a* allows for capturing one or more images of the target including the DPM indicia 104 onto an image sensor array 318. In some embodiments, the imager 312-*a* may include a main lens and a micro lens. The micro lens array may be disposed between the main lens and the image sensor array 318 and may comprise thousands of micro lenses (e.g., any number of suitable lenses as would be evident to one of ordinary skill in the art). In accordance with some embodiments, when capturing one or more images of the target, analog signals of the target or portions thereof that are provided by the image sensor array 318 may be amplified by a gain block 320 and may converted into digital form (by an analog-to-digital converter 322) and sent to a DMA unit 324. In this regard, the DMA unit 324, in turn, may transfer digitized image data into a volatile memory 326. In accordance with some embodiments, the processing unit 316 may address one or more frames of image data retained in the volatile memory 322 for processing of the frames as described below for indicia decoding.

In accordance with some embodiments, the imager 312-*a* may comprise multiple pixel image sensor arrays 318 having pixels arranged in rows and columns and associated column circuitry 328 and row circuitry 330. In this regard, in accordance with illustrated embodiment, the imager 312-*a* may be associated with the gain block 320 including amplifier circuitry, and an analog to digital converter 332 which converts image information in the form of analog signals of the image sensor array 318 into image information in the form of digital signals. The imager 312-*a* may also have an associated timing and control circuit 334 for use in controlling the exposure period of the imager 312-*a*, gain applied to the gain block 320 including an amplifier, or the like. In this aspect, noted circuit components 312-*a*, 320, and 332 may be packaged into a common image sensor integrated circuit 334. In accordance with various embodiments described herein, the imager sensor integrated circuit 332 including the image sensor array 318 and imaging lens assembly may be incorporated in a hand-held housing.

In the course of operation of devices, image signals can be provided by the imager 312-*a*, converted, and stored into a system memory such as RAM 336. Memory 314 of the devices may include the RAM 336, a nonvolatile memory such as EPROM 338 and a storage memory device 340 that may be provided by a flash memory, a hard drive memory, or any combination thereof. In one embodiment, the devices may include the processing unit 316 which may be adapted to read out image data stored in the memory 314 and subject such image data to various image processing algorithms. The devices can include a direct memory access unit (DMA) 322 for routing image information read out from the imager 312-*a* that has been subject to conversion to the RAM 336. In another embodiment, the devices may employ a system bus providing for bus arbitration mechanism (e.g., a PCI bus) thus eliminating the need for a central DMA controller. As would be evident to one of ordinary skill in the art in light of the present disclosure, other embodiments of the system bus architecture and/or direct memory access components providing for efficient data transfer between the imager 312-*a* and the RAM 336 are within the scope and the spirit of the disclosure.

In another aspect, the indicia reading device 301 includes a power supply 342 that supplies power to a power grid 344 to which electrical components of the indicia reading device 301 may be connected. The power supply 342 may be coupled to various power sources (e.g., a battery 346, a serial interface 348 (e.g., USB, RS232), and/or AC/DC transformer 350).

As illustrated, the indicia reading device 301 may include a power input unit 352 including a charging capacitor that is continually charged by the power supply 342. In this way, the power input unit 352 may be configured to output energy within a range of energization levels associated with illumination exposure periods of the illumination sub-system 310.

As illustrated, the indicia reading device 301 may include a number of peripheral components including, but not limited to, a trigger 354 which may be used to activate a trigger signal for activating frame readout and/or certain decoding processes. In this aspect, the indicia reading device 301 may be adapted so that activation of the trigger 354 activates a trigger signal and initiates a decode attempt. Specifically, the indicia reading device 301 may be operative so that in response to activation of a trigger signal, a succession of frames may be captured by way of read out of image information from the image sensor array 318 (e.g., typically in the form of analog signals) and then stored after conversion into memory 314 (which can buffer one or more of the succession of frames at a given time). In this regard, the processing unit 316 may be configured to subject one or more of the succession of frames to a decode attempt.

As illustrated, the indicia reading device 301 may include various interface circuits for coupling various peripheral devices to system address/data bus (system bus 356), for communication with the processing unit 316 also coupled to the system bus 356. The indicia reading device 301 may further include an interface circuit 358 for coupling the imager 312-*a* and an imager timing and control circuit 360 to the system bus 356, an interface circuit 362 for coupling illumination light source bank power input unit 342 to the system bus 356, and an interface circuit 364 for coupling the trigger 354 to the system bus 356. As illustrated, the indicia reading device 301 may also include a display 366 coupled to the system bus 356 that is in communication with the processing unit 316 via an interface 368 and a pointer mechanism 370 in communication with the processing unit 316 via an interface 372 connected to the system bus 356. In some embodiments, the indicia reading device 301 may also include a keyboard 374 coupled to the systems bus 356 that is in communication with the processing unit 316 via an interface 376. In accordance with some embodiments, the indicia reading device 301 may also include a range detector unit 378 coupled to the system bus 356 via an interface 380. In one embodiment, the range detector unit 378 may be an acoustic range detector unit. Various interface circuits of the devices may also share circuit components. For example, a common microcontroller providing control inputs to circuit 382 and to the power input unit 352 may be provided to coordinate timing between image sensor array controls and illumination subsystem controls.

In accordance with another embodiment, the processing unit 316 may be operative to decode specular reflections using different viewing angles from the imager 312-$a$ to reconstruct a specular free image from the frames of images captured at different viewing angles. In yet another example embodiment, the processing unit 316 may be further configured for anti-counterfeiting by recognizing object texture and/or specific tags, including but not limited to, random indentions/protrusions (e.g., Bubble Tag™ or the like), random microchips of metal embedded in a polymer, stereo views of security holograms (i.e., that will look different from differing angles of the stereoscopy imagery), the like, etc.

Figure 4:
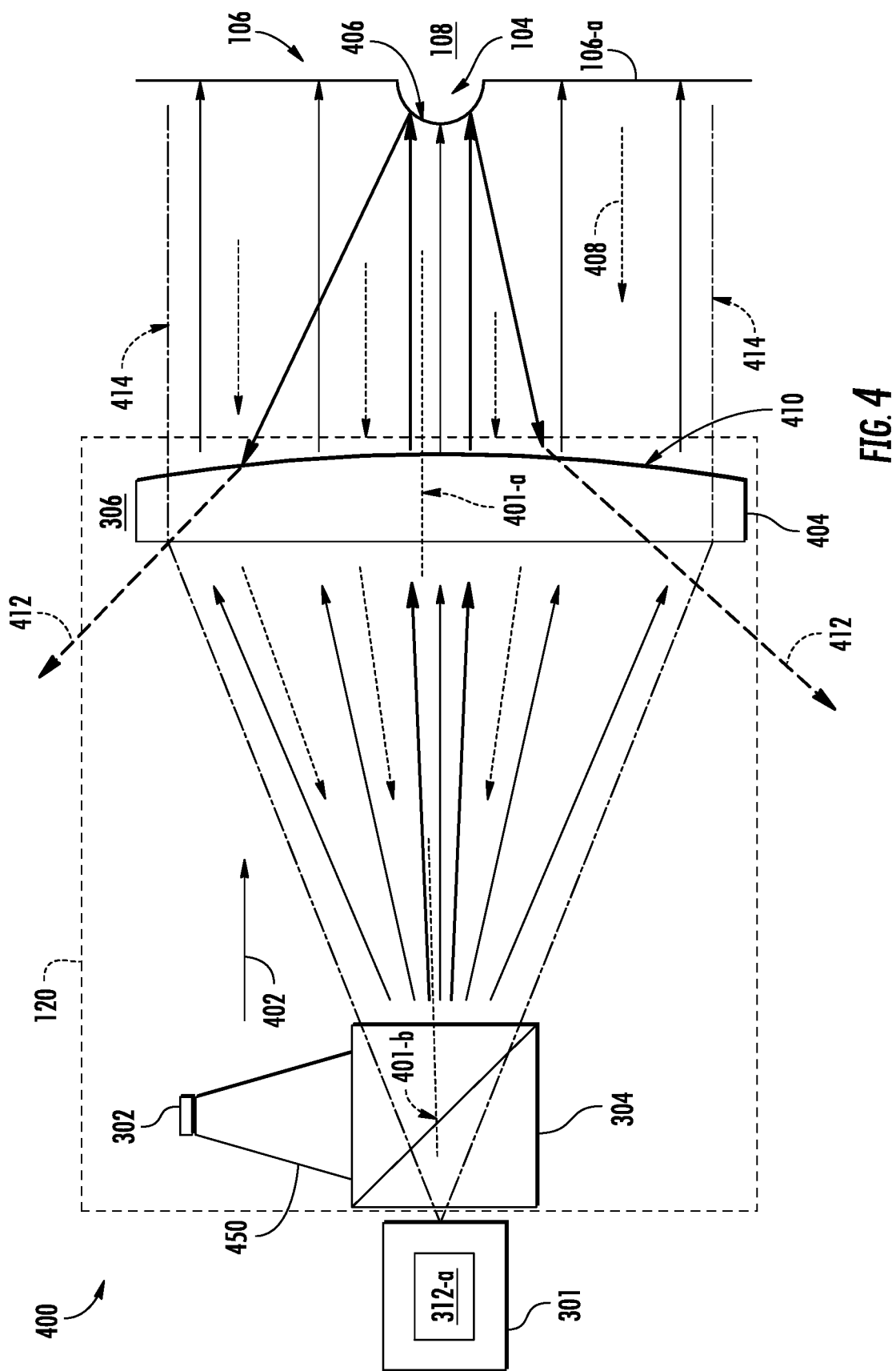
FIG. 4 graphically depicts scanning of DPM indicia by the scanning system, in accordance with some example embodiments described herein.

FIG. 4 graphically depicts scanning of an indicia, such as the DPM indicia 104 by a scanning system 400, in accordance with some example embodiments described herein. As illustrated, the scanning system 400 may include the indicia reading device 301 and the DPM illumination assembly 120 adapted for scanning and decoding the DPM indicia 104. In this regard, the DPM illumination assembly 120, including the in-line illumination module 302, the beam splitter module 304, and the telecentric lens 306 may be positioned along the indicia reading device 301. As illustrated, the arrangement is such that an optical axis 401-$a$ of the telecentric lens 306 is co-linear with an imaging axis 401-$b$ of the imager 312-$a$ of the indicia reading device 301. Also, in accordance with various embodiments described herein, the DPM illumination assembly 120 may be mounted and/or arranged to the imager 312-$a$ such that the imager 312-$a$ is positioned at a focal plane, passing through a foci 403, of the telecentric lens 306. In some embodiments, the illumination assembly 120 may is positioned at a focal plane of the telecentric lens 306 (e.g., for DPM indicia located on a flat surface). In other embodiments, such as instances in which DPM indicia is located on a curved surface, the telecentric lens 306 may be positioned such that a converging beam or a diverging beam exiting the telecentric lens 306 aligns with a curvature of the target.

In accordance with various embodiments described herein, the in-line illumination module 302 may be a light source (e.g., an LED), that is adapted to provide light onto the beam splitter module 304. In this aspect, in one embodiment, the in-line illumination module 302 provides an in-line illumination in addition to an illumination provided by the illumination sub-system 308 of the indicia reading device 301. In conventional systems, high intensity illumination is desired in order to collect diffuse light. In some configurations of the present application, however, high intensity may be undesirable in that the system is collecting specular reflection as opposed to diffuse light. As would be evident to one of ordinary skill in the art in light of the present disclosure, the intensity described hereafter may be configured at any intensity based upon the require application. The in-line illumination module 302, in accordance with various embodiments, is therefore adapted to provide illumination by projecting the light towards the beam splitter module 304 (e.g., via tapered light pipe 450) which is further directed in a direction of the target 108 including the DPM indicia 104. As illustrated, upon the projection of the in-line illumination by the illumination module 302, the light is received into the beam splitter module 304, including a beam splitter. In this aspect, the beam splitter is adapted to split light rays of the in-line illumination, into parts such that, at least one portion of the light rays is directed in a direction of the imaging axis 401-$b$ of the imager 312-$a$ in the indicia reading device 301. In this way, the beam splitter module 304: (i) directs the in-line illumination in a first direction 402 of the target 108 including the DPM indicia 104, and (ii) merges various split portions of the light rays in a direction of the imaging axis 401-$b$ of the imager 312-$a$, as the in-line illumination is directed out from the beam splitter module 304.

In operation, the in-line illumination projected out from the beam splitter module 304 travels in the first direction 402 and is incident on a first surface 404 of the telecentric lens 306. It may be understood, that according to various example embodiments, light rays corresponding to the in-line illumination may be incident on the first surface 404 at various angles relative to the optical axis 401-$a$ of the telecentric lens 306. In this regard, the telecentric lens 306 is adapted to direct the in-line illumination incident on the first surface 404 forward in the first direction 402 of the DPM indicia 104. In accordance with various embodiments described herein, the telecentric lens 306 directs the in-line illumination, in a manner that light rays of the in-line illumination which is incident on the first surface 404 of the telecentric lens 306, is directed out from the telecentric lens 306, parallel to the optical axis 401-$a$ and in the first direction 402 of the target 108.

As illustrated, the in-line illumination, upon being directed out via the telecentric lens 306 is incident on the target 108 including the DPM indicia 104 and reflected by the target 108 in a second direction 408 of the imager 312-$a$. In accordance with various example implementations of the illustrated embodiments, the DPM indicia 104 may include one or more embossment 406 on the substrate 106. In this regard, at least a first part of the in-line illumination (i.e. including a set of light rays that is incident on the embossment 406) is reflected at a defined angle with respect to the optical axis 401-$a$, in the second direction 408 from the target 108. For instance, in an example embodiment, the first part of the in-line illumination may include multiple light rays which are incident at various points on the embossment 406 and are reflected at different angles with respect to the optical axis 401-$a$ of the telecentric lens 306. Further details of the reflection of the in-line illumination from the target 108 are described in reference to FIGS. 5A and 5B, respectively. Also, according to such an embodiment, at least a second part of the in-line illumination, which in the first direction 402, travels parallel with respect to the optical axis 401-$a$ of the telecentric lens 306 and is incident on a plain surface 106-$a$ of the substrate 106, is reflected from the target 108, in the second direction 408, parallel to the optical axis 401-*a*. For purpose of understanding and clarity, the in-line illumination reflected from the target 108 is referred hereinafter as the reflected light throughout the description. Accordingly, upon reflection of the in-line illumination from the target 108, on a second surface 410 of the telecentric lens 306 (i) at least a first portion, from the first part of the reflected light is incident at a defined angle with respect to the optical axis 401-*a*, and (ii) a second portion from the second part of the reflected light that, upon reflection, travels parallel to the optical axis 401-*a*, is incident with relatively zero angle with respect to the optical axis 401-*a*.

In accordance with said embodiments, the telecentric lens 306 is adapted to (i) decouple the first portion of the reflected light in a third direction 412, outside an optical path 414 formed by the in-line illumination and (ii) direct the second portion of reflected light from the target 108 in the second direction 408 of the imager 312-*a*. In this regard, the telecentric lens 306 is adapted to direct the second portion of the reflected light in the second direction 408 a of the imager 312-*a*. As described before, since the arrangement of the telecentric lens 306 and the imager 312-*a* of the indicia reading device 301 is such that, the imager 312-*a* is positioned at a focal plane of the telecentric lens 306 and the optical axis 401-*a* of the telecentric lens 306 is co-linear with the imaging axis 401-*b* of the imager 312-*a*, in operation, the second portion of the reflected light travels along the imaging axis 401-*b* in the second direction 408 and is received at the imager 312-*a*. Thus, in operation, the imager 312-*a* receives reflected light from the DPM indicia 104 that has travelled parallel to the optical axis 401-*a* upon reflection from the target 108 and is directed by the telecentric lens 306 in the second direction 408. By way of implementation, per the embodiments described herein, in operation, the imager 312-*a* receives a high proportion of such light rays in the reflected light, which are reflected from the substrate 106-*a* of the target 108, as most of light rays reflected from the embossment 406 of the DPM indicia 104 is decoupled after refraction, by the telecentric lens 306 in the third direction 412. It may be understood that there may be plurality of such embossments 406 in the DPM indicia 105, and the telecentric lens 306 may decouple a high proportion of the reflected light from the embossments 406 out of the optical path 414. In this way, an almost negligible portion of the reflected light from the embossments 406 reaches the imager 312-*a*. Accordingly, based on exposure to the high proportion of the reflected light from plain surface 106-*a* of the substrate 106, the imager 312-*a* generates a reverse contrast image of the DPM indicia 104. The reverse contrast image is such that, in the image, a background of the DPM indicia 104 (i.e., a portion corresponding to the substrate 106 in the DPM indicia 104), appears substantially white and a portion corresponding to dots (i.e., the embossments 406), appears substantially black. Typically, in the reverse contrast image generated by the imager 312-*a*, all surfaces on the target 108 having a polished surface appear white. Given that the imager 312-*a* will receive most of the reflected light from those surfaces and all rough surfaces, the embossments 406 will appear black since most of the light will be either diffused or absorbed and won't reach the imager 312-*a* (e.g., or light intensity will be relatively small as compared by light generated through specular reflection).

FIGS. 5A and 5B graphically depict two DPM illumination assemblies 510 and 550, respectively, including the telecentric lens 306 and its operations for scanning the DPM indicia 104, in accordance with various example embodiments described herein. As shown, the DPM illumination assembly 510 depicts operation of the telecentric lens 306 in an instance in which an in-line illumination is incident the telecentric lens 306 from a light source, such as the illumination module 302. The DPM illumination assembly 550 depicts operation of the telecentric lens 306 in an instance when, upon illumination, reflected light from a target, such as the DPM indicia 104, is incident on the telecentric lens 306.

As illustrated, with reference to FIG. 5A, the telecentric lens 306 may receive on its surface, such as the first surface 404, in-line illumination from an external light source along the optical axis 401-*a* of the telecentric lens 306. As described in reference to FIG. 4, in one embodiment, the telecentric lens 306 may receive the in-line illumination generated from the illumination module 302 (e.g., a set of light emitting diodes (LEDs) projected in the first direction 402 of the DPM indicia 104 via the beam splitter module 304). According to another embodiment, light rays incident the telecentric lens 306 may also include light in addition to the in-line illumination generated from the illumination module 302, for instance, light in an environment surrounding the telecentric lens 306. As illustrated, the in-line illumination incident on the first surface 404 of the telecentric lens 306 may include a light pattern formed of multiple light rays 502-1, 502-2 . . . 502-N. In this way, each light ray from amongst the light rays 502-1, 502-2 . . . 502-N may travel either parallel and/or at different angles with respect to the optical axis 401-*a*. Accordingly, one or more of the light rays 502-1, 502-2 . . . 502-N may be incident on the first surface 404, at a defined angle, i.e. zero or non-zero angle, relative to the optical axis 401-*a*. The telecentric lens 306 may be configured to direct, via the second surface 410, the incident in-line illumination in form of collimated light including light rays 504-1, 504-2 . . . 504-N such that the light rays travel parallel to the optical axis 401-*a* in the first direction 402 of the DPM indicia 104. Thus, light rays (e.g., the light ray 502-2 and 502-3 which may be incident at a non-zero angle with respect to the optical axis 401-*a* when directed from the second surface 410) travel parallel to the optical axis 401-*a*. The in-line illumination including the light rays 504-1, 504-2 . . . 504-N may be utilized for illuminating indicia, such as the DPM indicia 104. In this regard, illumination created by the light rays 504-1, 504-2 . . . 504-N is such that, upon illumination, the light rays 504-1, 504-2 . . . 504-N cover the entirety of the target including the DPM indicia 104. As it may be understood, when incident, the light rays 504-1, 504-2 . . . 504-N are reflected from the target depending upon the reflectivity of surface of the target. Details of the reflection of the light rays 504-1, 504-2 . . . 504-N are described in reference to FIG. 5B in conjunction with the operations of the DPM illumination assembly 552.

As illustrated in FIG. 5B, the reflected light from the target 108 may travel in the second direction 408 of the telecentric lens 306. In this way, the reflected light may include multiple reflected light rays 552-1, 552-2 . . . 552-N each of which may be reflected from different locations on the DPM indicia 104. For instance, the reflected light rays 552-1 and 552-N-1 may be reflected from the embossment 406-*a* and the embossment 406-*b* of the DPM indicia 104. Similarly, the reflected light rays 552-2 and 552-N may be reflected from the substrate 106 of the DPM indicia 104. As illustrated, upon reflection, the light rays that are reflected from rough surfaces, such as the embossments 406-*a* and 406-*b* of the DPM indicia 104, may be reflected at different angles with respect to the optical axis 401-*a* of the telecentric lens 306. Accordingly, while some of the reflected light rays 552-1, 552-2 . . . 552-N, upon reflection, may travel in the second direction 408 parallel to the optical axis 401-*a*, some other reflected light rays, such as the reflected light rays 552-2 and 552-N−1, may travel at different angles with respect to the optical axis 401-*a* in the second direction 408. In this regard, the telecentric lens 306 (i) receives a first portion of the reflected light rays that may be incident at different, non-zero angles, with respect to the optical axis 401-*a* (i.e. light rays that are reflected from the embossments 406-*a* and 406-*b*), and (ii) receives a second portion of the reflected light rays that may be incident at a zero angle with respect to the optical axis 401-*a* of the telecentric lens (i.e. light rays that are reflected parallel to the optical axis 401-*a*) on the second surface 410, respectively. According to various embodiments described herein, the telecentric lens 306 is adapted to decouple the first portion of the reflected light rays, (e.g., the light rays 552-2 and 552-N−1 that are reflected from the embossments 406-*a* and 406-*b* of the DPM indicia 104), in the third direction 412. Further, the telecentric lens 306 is configured to direct the second portion of the reflected light rays including, but not limited to, light rays reflected from non-rough surfaces of the DPM indicia 104 (i.e. surface excluding the embossments 406-*a* and 406-*b*). For example, in some embodiments, the telecentric lens 306 may direct the light rays 552-1 and 552-N that are reflected from non-embossing surface like the surface 106-*a* of the substrate of the DPM indicia 104 in the second direction 408 of the imager 312-*a*. Accordingly, excluding the coupled-out portion of the reflected light (i.e., the second portion of the reflected light rays are directed out via the first surface 404 of the telecentric lens 306 in the second direction 408), the second portion of the reflected light travels as collimated light rays 554-1, 554-2 . . . 554-N in the second direction 408 of the imager 312-*a*. Further, the second portion of the reflected light rays is utilized for exposing the imager 312-*a* to scan the DPM indicia 104.

Figure 6:
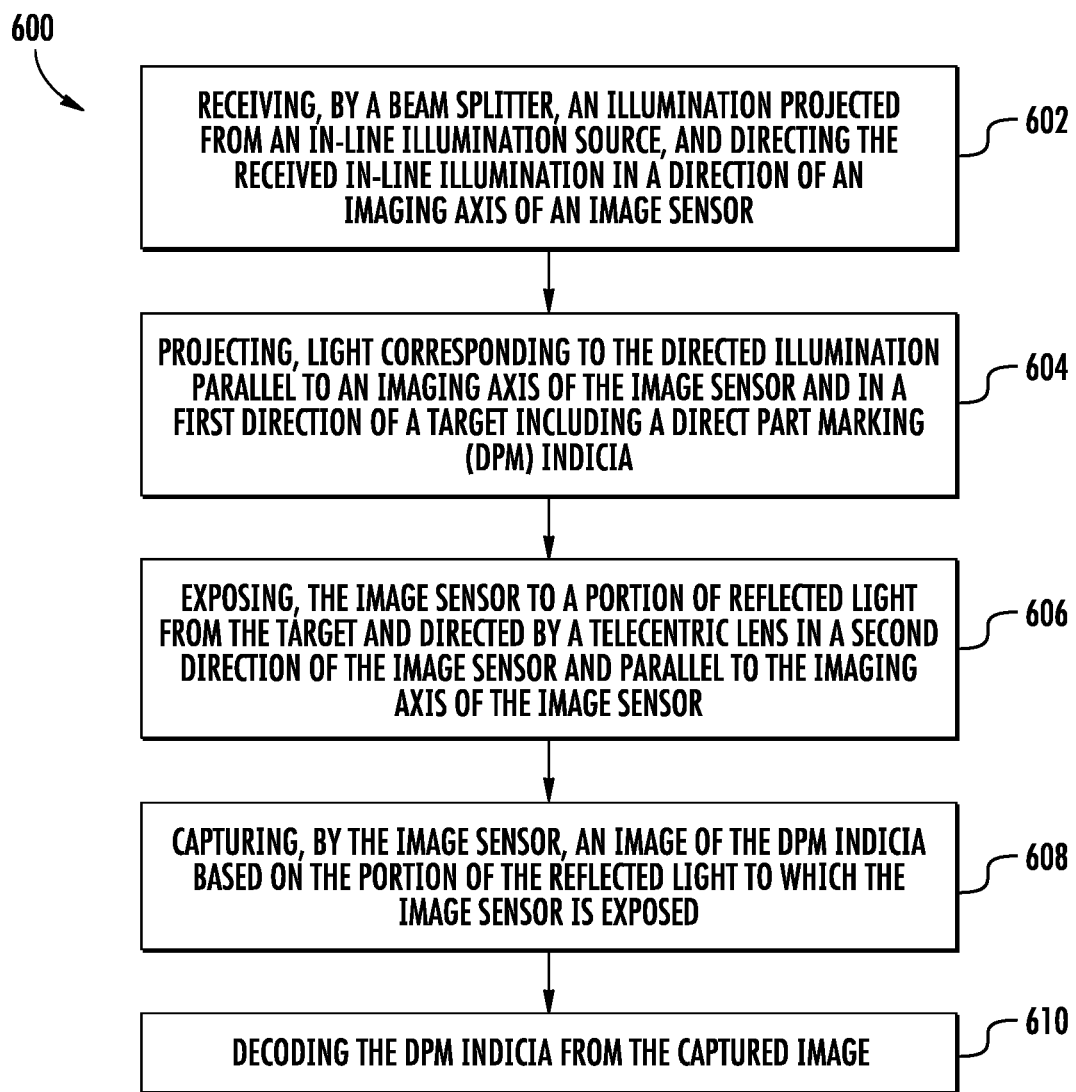
FIG. 6 is a flowchart describing a method of scanning and decoding the DPM indicia using the scanning system in accordance with some example embodiments described herein.

FIG. 6 illustrates an example flowchart of operations performed by the scanning system 100, 200, 300, and 400 of FIGS. 1-4, respectively, in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. Accordingly, blocks of the flowchart support combinations of means for performing the specified functions and combinations of operations for performing the specified functions. It will also be understood that one or more blocks of the flowcharts', and combinations of blocks in the flowchart, can be implemented by special purpose hardware-based computer systems which perform the specified functions, or combinations of special purpose hardware and computer instructions.

At step 602, the DPM illumination assembly 120 of the scanning system 400, includes means, such as the beam splitter module 304, configured to receive an illumination projected from an in-line illumination source, such as the illumination module 302. According to various embodiments described herein, the illumination may be projected from the illumination module based on actuation of the trigger 110 to initiate scanning of the DPM indicia 104. In this regard, in accordance with various embodiments described herein, based on the receiving of the illumination from the illumination module, the beam splitter module 306 directs the received illumination in-line in a direction of the imaging axis 401-*b* of the imager 312-*a*. According to an example embodiment, the beam splitter module 304 directs the illumination as an in-line illumination such that the beam splitter module 304 merges a travel direction of light rays in the received illumination in a direction of the imaging axis 401-*b* of the imager 312-*a*. Thus, the in-line illumination is directed along the direction of the imaging axis such that the light rays in a converging fashion travel along the direction of the imaging axis 401-*b* outwardly from an opening window of the beam splitter module 306.

At step 604, the DPM illumination assembly 120 of the scanning system 400 includes means, such as the beam splitter module 304, configured to project light corresponding to the directed in-line illumination along the imaging axis 401-*a* of the imager 312-*a*, and in the first direction 402 of the target 108 including the DPM indicia 104.

At step 606, the scanning system 400 includes means such as the imager 312-*a*, that is exposed to a portion of reflected light from the target 108. In this regard, the portion of the reflected light may be directed, via the telecentric lens 306 of the DPM illumination assembly 120, in the second direction 408 of the imager 312-*a*. The portion of the reflected light travels along the imaging axis 401-*a* to the imager 312-*a*. In accordance with various embodiments described herein, the imager 312-*a* is exposed to a portion of the reflected light that, upon reflection, travels in the second direction 408 of the imager 312-*a* parallel to the optical axis 401-*a* of the telecentric lens 306 and is received at the imager 312-*a*. In this regard, as the reflected light from the target is incident the telecentric lens 306, the telecentric lens 306 directs the incident reflected light out in the second direction 408 in collimated form. For instance, the telecentric lens 306 collimates all light rays which are incident on a surface, such as the second surface 410 of the telecentric lens 306, such that the light rays are directed out in the second direction 408 and are received at the imager 312-*a*. In accordance with embodiments described herein, the telecentric lens 306 directs the reflected light as collimated light rays, such that a portion of the reflected light that is directed out from the telecentric lens 306 travels to the imager 312-*a* with negligible divergence and dispersing of the light.

At step 608, the scanning system 400, includes means, such as the imager 312-*a* to capture an image of the DPM indicia 104 based on the portion of the reflected light to which the imager 312-*a* is exposed, for instance, during scanning of the DPM indicia 104. In this way, the imager 312-*a* captures the reverse contrast image as described in reference with FIG. 4. In accordance with various embodiments described herein, the imager 312-*a* may include an image sensor configured to sense intensity of light energy for one or more light rays of the portion of the reflected light to which the imager 312-*a* is exposed. Intensity values indicating measurement of sensed intensity are stored in the memory 314 and correlated with data identifying relative locations on the DPM indicia 104 from which corresponding light rays are reflected (with which the respective intensity value is associated). Accordingly, based on the intensity values, the reverse contrast image as described in reference to FIG. 4, is generated. The generated reverse contrast image may be defined such that the captured image includes a pattern of dark spots and light spots, where the dark spots correspond to a surface of a substrate of the target and the light spots corresponds to embossments of the DPM indicia 104 on the target 108.

At step 610, the scanning system 400 includes means such as, the decoding module, configured to decode the DPM indicia from the captured image. In accordance with various embodiments, the decoded DPM indicia may be displayed via the display 112 of the indicia reading device 102. As would be evident to one of ordinary skill in the art in light of the present disclosure, a captured reverse contrast image is formed of a high pixel intensity area (e.g., corresponding to the background) and a low pixel intensity area (e.g., corresponding to the dots of the DPM barcode). In order to extract a barcode (e.g., or other information), image processing methods may be used such that the extracted barcode may be provided to a decoder algorithm for interpreting the contents therein. The present disclosure contemplates that any barcode extract or equivalent image processing system may be used in order to interpret the images gathered herein.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively or in addition, some steps or methods may be performed by circuitry that is specific to a given function.

In one or more example embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

The invention claimed is:

1. A system comprising:
an illumination assembly comprising:
an illumination module configured to generate an illumination, and
a beam splitter module configured to receive the illumination and project the illumination as an in-line illumination in a first direction of a target, wherein the target comprises direct part marking (DPM) indicia;
a telecentric lens assembly configured to:
decouple a first portion of light reflected from at least one rough surface of the target, and
couple a second portion of light reflected from at least one non-rough surface of the target; and
an imaging subsystem comprising an imager, wherein the imaging subsystem is configured to generate a reverse contrast image, in response to, receiving the second portion of reflected light, wherein to generate the reverse contrast image, the imaging subsystem is configured to:
sense intensity values associated with the second portion of the reflected light, and
correlate the intensity values with data identifying relative locations of the at least one non-rough surface of the target on the DPM indicia from which the second portion of light is reflected.

2. The system according to claim 1, wherein the first portion of reflected light is incident on a second surface of the telecentric lens assembly at a defined angle with respect to an optical axis of the telecentric lens assembly, and wherein the second portion of reflected light travels parallel to the optical axis of the telecentric lens assembly and is incident at the second surface of the telecentric lens assembly.

3. The system according to claim 1, further comprising a decoder module configured to decode the DPM indicia.

4. The system according to claim 3, further comprising a trigger configured to actuate at least one of: the imaging subsystem, the illumination module, and the decoder module.

5. The system according to claim 3, further comprising an output module configured to:
receive an output provided by the decoder module in response to decoding the DPM indicia; and
display the output.

6. The system according to claim 1, wherein the second portion of reflected light, directed in a second direction of the imager, comprises collimated light from at least one non-rough surface of the target.

7. The system according to claim 1, wherein the beam splitter module is further configured to merge the in-line illumination in a direction of an imaging axis of the imager.

8. The system according to claim 1, wherein the telecentric lens assembly is arranged between the target and the imager and wherein the beam splitter module is arranged between the illumination module and the telecentric lens assembly.

9. The system according to claim 1, wherein the illumination module is positioned at a focal plane of the telecentric lens assembly.

10. The system according to claim 1, wherein the telecentric lens assembly is positioned such that a converging beam or a diverging beam exiting the telecentric lens assembly aligns with a curvature of the target.

11. The system according to claim 1, further comprising a housing supporting the illumination assembly and the imaging subsystem.

12. The system according to claim 11, wherein the telecentric lens assembly comprises a telecentric lens.

13. The system according to claim 12, wherein the illumination assembly comprising the illumination module, the beam splitter module, and the telecentric lens assembly, is mechanically engaged on the housing such that an imaging axis of the imaging subsystem is co-linear with an optical axis of the telecentric lens.

14. The system according to claim 12, wherein the imager of the imaging subsystem is positioned at a focal plane passing through a focus of the telecentric lens.

15. The system according to claim 12, wherein the telecentric lens is arranged within the housing and adapted to pass through at least one of: a converging beam or a diverging beam of the illumination from a second surface such that the illumination projected from the telecentric lens aligns with a curvature of the target.

16. A method comprising:
receiving, by a beam splitter, an illumination projected from an illumination source;
projecting, by the beam splitter, the illumination as an in-line illumination wherein the in-line illumination includes light rays directed along a first direction of a target, wherein the target comprises a direct part marking (DPM) indicia;
directing, by a telecentric lens, a first portion of reflected light from at least one rough surface of the target that is incident on a second surface of the telecentric lens in a direction away from an imager;
exposing the imager to a second portion of reflected light from the target that is directed by the telecentric lens in a second direction of the imager, wherein the second portion of reflected light is directed in the second direction along an imaging axis of the imager; and
generating, by the imager, a reverse contrast image of the DPM indicia based on the second portion of reflected light by:
sensing intensity values associated with the second portion of the reflected light, and correlating the intensity values with data identifying relative locations of at least one non-rough surface of the target on the DPM indicia from which the second portion of light is reflected.

17. The method according to claim 16, further comprising decoding the DPM indicia.

18. The method according to claim 16, further comprising decoupling the first portion of reflected light from the target.

19. A computer program product comprising at least one non-transitory computer-readable storage medium having computer program instructions thereon, the computer program instructions, when in execution with a processor, configured to:
project an illumination, projected from an illumination source, as an in-line illumination, wherein the in-line illumination includes light rays directed along a first direction of a target, wherein the target comprises a direct part marking (DPM) indicia;
direct a first portion of reflected light from at least one rough surface of the target in a direction away from an imager;
expose the imager to a second portion of reflected light from the target that is directed in a second direction of the imager, wherein the second portion of reflected light is directed in the second direction along an imaging axis of the imager; and
generate a reverse contrast image of the DPM indicia based on the second portion of reflected light by:
sensing intensity values associated with the second portion of the reflected light, and
correlating the intensity values with data identifying relative locations of at least one non-rough surface of the target on the DPM indicia from which the second portion of light is reflected.

20. The computer program product of claim 18, wherein the computer program instructions, when in execution with the processor, are configured to decode the DPM indicia.

* * * * *